March 14, 1944.　　　G. W. KEENE　　　2,343,980
FILM REEL
Filed Sept. 11, 1942　　　2 Sheets-Sheet 1
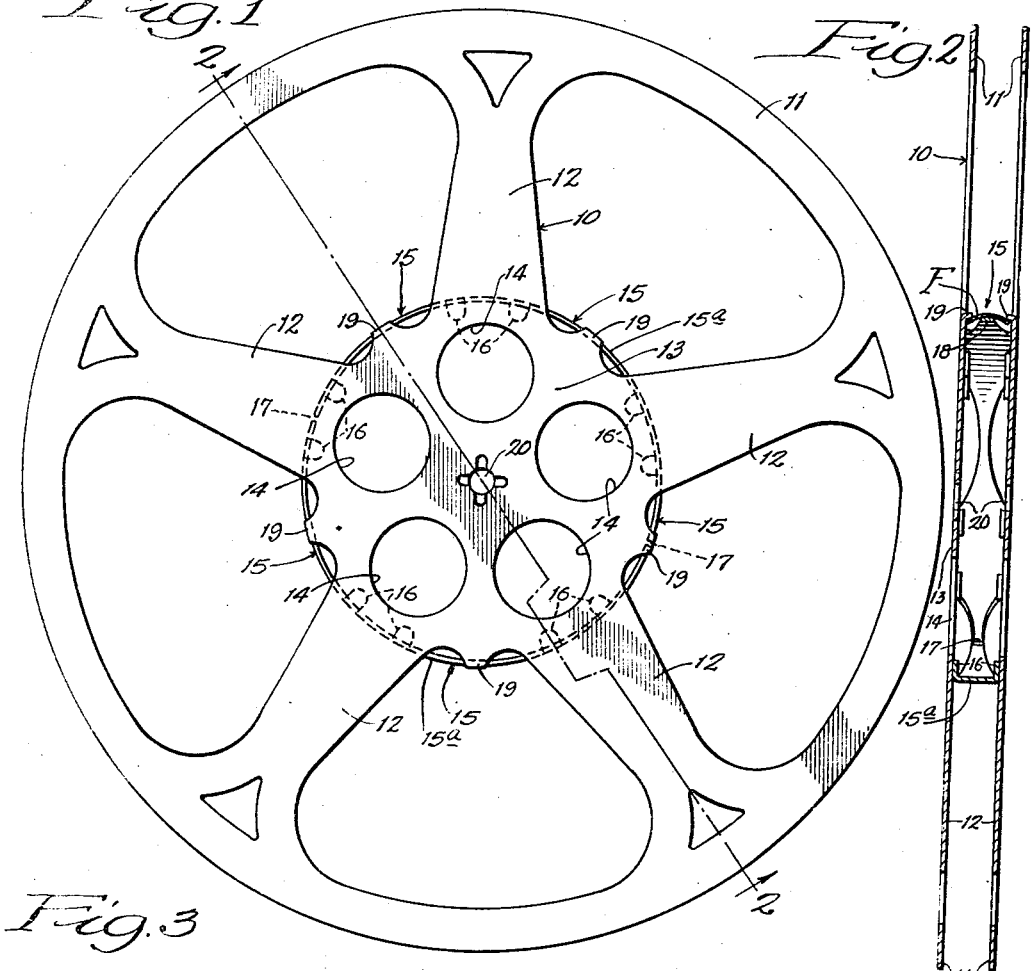
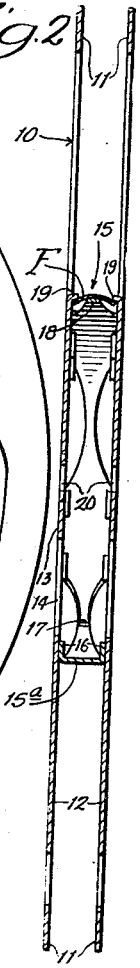
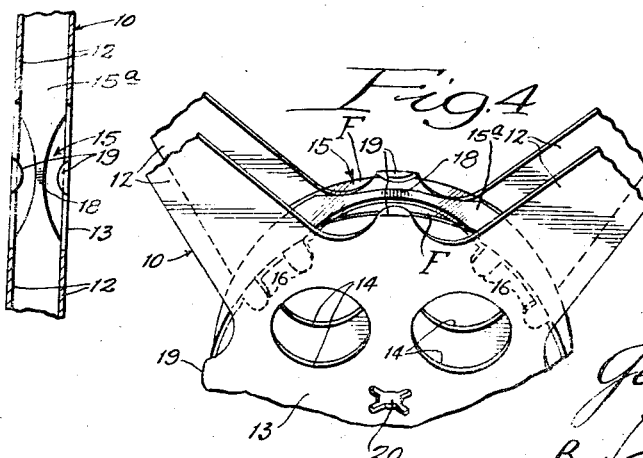
Inventor
George W. Keene,
By Dunning & Dunning
Attorneys.

March 14, 1944.  G. W. KEENE  2,343,980
FILM REEL
Filed Sept. 11, 1942  2 Sheets-Sheet 2
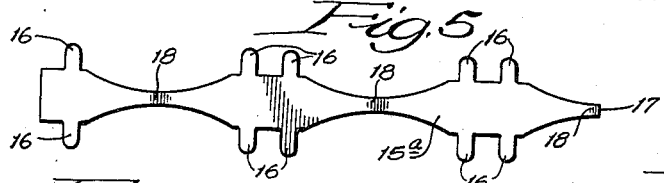
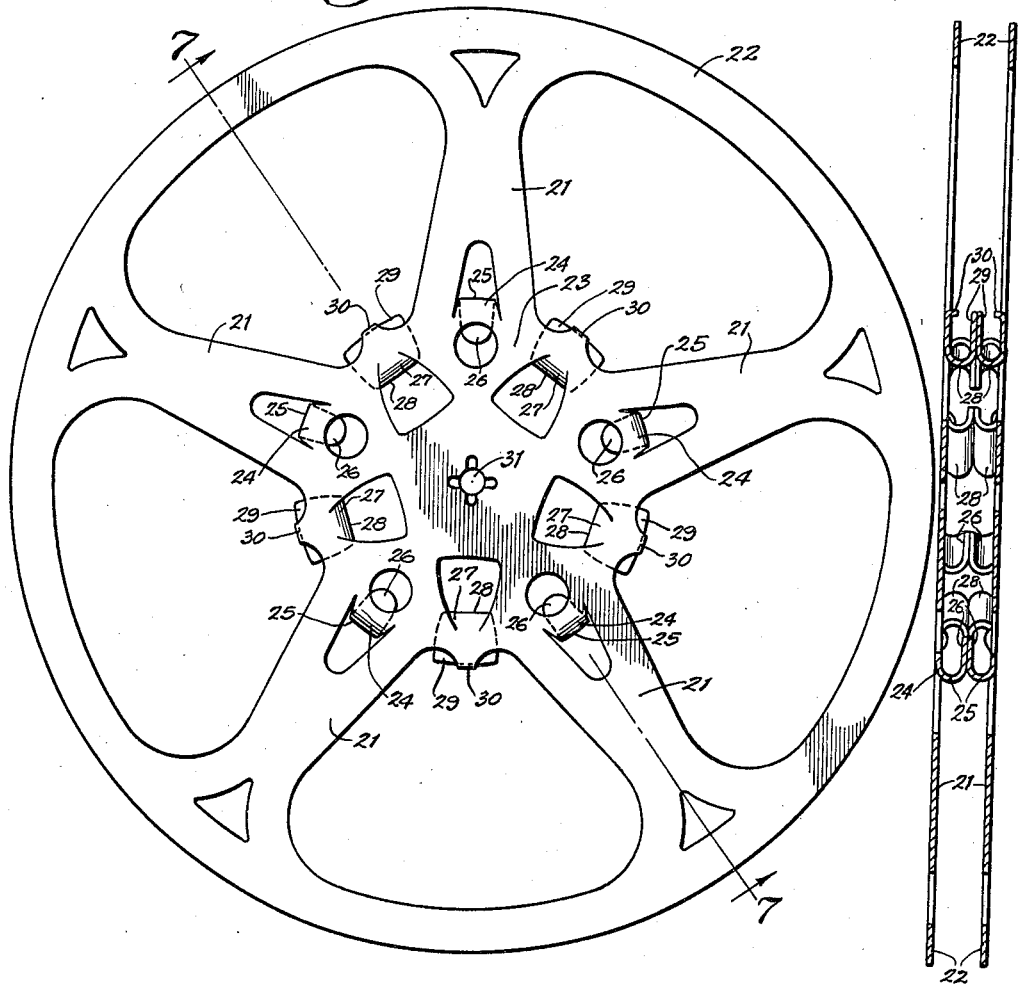
Inventor:
George W. Keene,
By Banning Banning
Attorneys.

Patented Mar. 14, 1944

2,343,980

UNITED STATES PATENT OFFICE 2,343,980

FILM REEL

George W. Keene, Maywood, Ill.

Application September 11, 1942, Serial No. 457,932

5 Claims. (Cl. 242—74)

This invention is directed to the general structure of the reel and particularly to the means provided for engaging a strip of film near its end to hold the same under moderate tension in order to prevent slippage of the film upon the hub. In devices of this general character with which I am familiar, it has been the general practice to provide spring tongues or the like between which the film is forced in mounting it upon the hub, and such tongues are arranged to exert a light spring pressure against the edges of the film; but difficulty is sometimes experienced due to the fact that the tongues may become slightly bent or displaced, and in view of the fact that the thin edge only of the film is subjected to spring contact, the use of such a device is frequently unsatisfactory. In the present invention, I rely rather on the inherent flexibility of the film itself to maintain adequate frictional contact by providing the hub with one or more bridge portions of reduced width which permit the contiguous side edges of the film to be flexed inwardly and engaged beneath opposed projections which thus hold the film bowed or flexed and under its own inherent tension so that accidental displacement will not occur.

The arrangement is one which permits the film to be easily and conveniently secured upon the hub of the reel and at the same time permits withdrawal without danger of tearing after the film has been unwound and while still under winding tension.

The invention in one of its forms is also directed to the two-piece reel construction embodying the features above noted in such a way as to permit companion reel sections to be stamped from plate metal and united in an easy and convenient manner.

Further objects and details will appear from the description of the invention in conjunction with the accompanying drawings, wherein —

Figure 1 is a side elevation of the reel as formed with two sides and a separately formed hub;

Fig. 2 is a sectional view taken on line 2—2 of Fig. 1;

Fig. 3 is a detail of the hub bridge and coacting lips for engaging the film near its end;

Fig. 4 is a fragmental perspective view of the film-engaging portion of the reel;

Fig. 5 is a view of one of the hub blanks in flat condition;

Fig. 6 is a side elevation of a two-piece reel in which the hub portion is formed integrally with the sides, and;

Fig. 7 is a sectional view taken on line 7—7 of Fig. 6.

Referring particularly to the construction shown in Figures 1 to 5, the reel consists of two sides 10 formed of plate material of wheel-like configuration comprising a rim 11, spokes 12, and a center portion 13 which latter is provided with apertures 14 aligned with the spokes which reduces weight and permits access to be had to the interior.

The two sides are held in spaced relation by a cylindrical hub 15 which as shown is formed of two sections 15a of plate material stamped to provide the configuration shown in Fig. 5. The two sections are bent to circular form to afford the hub which carries the film and are preferably secured to the sides by the provision of edge tongues 16 which are bent inwardly and united with the sides at the bases of the spokes by spot welding or the like; although other means for securing the parts together might be used.

The two hub sections are spaced to afford oppositely disposed gaps 17 which, if desired, may be used to permit insertion of the end of the film through the hub in the conventional manner which, however, comprise no essential part of the present invention. The hub sections at points between the spoke bases are curvedly cut away on each side to provide a narrow center bridge 18 which bridge lies between opposed inwardly extending lips 19 so positioned that the under faces of the lips will lie in a plane inward of the outer face of the bridge with the result that when a film strip F is to be engaged, the edges of the strip will be flexed or bowed inwardly on opposite sides of the bridge and caught and held beneath the tongues so that the inherent flexibility of the film strip itself will hold the edges of the strip in firm frictional contact with the under sides of the lips.

In the formation of the bridge, the hub is cut away sufficiently to provide a relatively narrow strip which stands in somewhat widely spaced relation to the inner edges of the lips so that adequate clearance will be afforded to permit the operator to easily press down the edges of the film into engaging relation with the lips. The bridge presents opposed concave edges so that when the unwinding is complete, the end of the film strip will be drawn away under the unwinding tension and released without danger of tearing or abrasion. It will be understood that the reel is mounted on a spindle in the usual manner, a central aperture 20 being provided for that purpose.

In the form shown in Figures 6 and 7, similar means for engaging the film strip are provided but in this case the entire reel is formed from two side plates, each of wheel-like formation comprising spokes 21, a rim 22, and a central portion 23. Beyond the base of each spoke, on each side, the metal is cut free to provide tongues 24 attached to the central portion, which tongues are inwardly bent from the spokes to afford duplicate arching hub surfaces 25 with the tips 26 of the tongues extending radially inward and united by spot welding or the like.

It will be noted that 5 spokes are provided so that each spoke will stand in opposed relation to a gap between spokes on the opposite side of the structure, and opposite each of these gaps the metal of the central portion 23 is struck free to provide a tongue 27 which is bowed or arched at 28 and presents its end edges 29 radially outward to provide a thin or narrow bridge similar in function to the bridge 18 first described. The ends 29 are spot welded and these ends present their edges at a point between inwardly extending lips 30 which correspond in function to the lips 19 first described.

It will be apparent from the above description that the doubly-arched hub portions 25 stand in alternate relation to the bridge portions 29 so that interrupted contact is afforded the film at closely spaced intervals and in circular alignment so that a hub-like structure is provided and adequate provision made at recurrent intervals for engaging the film by flexing its edges downwardly on opposite sides of the bridge afforded by the tongue ends 29. The hub construction is provided with the usual central aperture 31 to permit the reel to be mounted upon a spindle in the conventional manner.

The construction of Figures 6 and 7 is one which enables the parts to be uniformly stamped from plate material, and in view of the fact that the hub tongues 24 are attached at their inner ends and recurved inwardly, it is not necessary to provide for a sharp bend or angle to snugly accommodate the edge of the film which would be the case if the hub sections were formed from tongues which, prior to bending, were connected with the spokes at their outer rather than their inner ends. By forming the tongues in the manner shown, sharp angles with resulting strain on the metal are avoided. The same thing is true of the bridge tongues which may be bent on easy lines of curvature so that sharp angles are avoided.

It will be noted that means are provided for engaging the film in the two different forms of construction which function in a substantially identical manner and that the differences in the mode of fabrication are without substantial effect in the operation of the completed structure. It will also be noted that the arrangement is one which affords a somewhat extended area of contact between the marginal face of the film and the means provided to prevent its slippage on the hub; and that in addition to the extended area thus provided, the film itself will contact the lips with considerable pressure due to its own inherent flexibility.

It will furthermore be noted that the film engaging means here provided are rigidly formed so that they will maintain an unvarying spacial relationship to one another which is often impossible in the use of spring tongues or the like which tend to become displaced or weakened so that their operation becomes defective and uncertain.

Although the invention has been described with particularity as to detail, it is not the intention, unless otherwise indicated in the claims, to limit the invention to minor features of construction.

I claim:

1. A reel for a film strip comprising spaced sides and a separately formed hub portion consisting of strip material bent to circular shape and interposed between the sides and having its edges rigidly secured thereto, said hub portion having therein a bridge of relatively narrow width defined by opposed concave edges affording a clearance on each side of the bridge, and opposed rigid lips extending inwardly at an abrupt angle from the sides and terminating short of the bridge and presenting their under faces inwardly of the outer face of the bridge and positioned to overlie and engage the marginal faces of a film strip when flexed across the bridge.

2. A reel for a film strip comprising companion side plates having inwardly struck therefrom opposed tongues having their end portions in abutting relation and rigidly united with their tips presented outwardly between the side plates to afford a relatively narrow bridge, and coacting lips inwardly struck from the side plates on opposite sides of the bridge and having their under faces located inwardly of the outer face of the bridge and positioned to engage the marginal faces of a film strip when flexed inwardly across the bridge.

3. A reel for a film strip comprising companion side plates having inwardly struck therefrom opposed tongues having their end portions in abutting relation and rigidly united with their tips presented outwardly between the side plates to afford a relatively narrow bridge, and coacting lips inwardly struck from the side plates on opposite sides of the bridge and having their under faces located inwardly of the outer face of the bridge and positioned to engage the marginal faces of a film strip when flexed inwardly across the bridge, and additional opposed tongues struck inwardly from the side plates and having their end portions recurved and presented inwardly and rigidly united and presenting their bends outwardly to afford in unison a hub-like surface for carrying the film strip.

4. A reel for a film strip comprising companion side plates having inwardly struck therefrom opposed tongues having their end portions in abutting relation and rigidly united with their tips presented outwardly between the side plates to afford a relatively narrow bridge, and coacting lips inwardly struck from the side plates on opposite sides of the bridge and having their under faces located inwardly of the outer face of the bridge and positioned to engage the marginal faces of a film strip when flexed inwardly across the bridge, and additional opposed tongues struck inwardly from the side plates and having their end portions recurved and presented inwardly and rigidly united and presenting their bends outwardly to afford in unison a hub-like surface for carrying the film strip, companion pairs of bridge forming tongues and hub forming tongues alternating with one another.

5. A reel for a film strip consisting of spaced side members and an interposed hub portion, the hub portion being provided in a portion of its circumference with a centrally disposed narrow bridge spaced from each of the side members and positioned to contact the center of the under face of a film while allowing each edge thereof to project laterally from the bridge, and opposed rigid lips extending inwardly from the side members at an abrupt angle thereto and presenting their tip edges inwardly in spaced relation to the respective sides of the bridge with the under sides of the lips inwardly offset relatively to the outer face of the bridge and spaced therefrom sufficiently to permit a film when contacted centrally by the bridge to have its margins flexed inwardly under the lips and engaged thereby to maintain the film under stress due to its flexation.

GEORGE W. KEENE.